US012710306B2

(12) United States Patent
Zehnder et al.

(10) Patent No.: US 12,710,306 B2
(45) Date of Patent: Aug. 18, 2026

(54) WEIGHING DEVICE WITH DISPLACEABLE PREPARATION TABLE

(71) Applicant: Mettler-Toledo GmbH, Greifensee (CH)

(72) Inventors: Marc Zehnder, Uster (CH); Daniel Zeiss, Stäfa (CH)

(73) Assignee: Mettler-Toledo GmbH, Greifensee (CH)

( * ) Notice: Subject to any disclaimer, the term of this patent is extended or adjusted under 35 U.S.C. 154(b) by 296 days.

(21) Appl. No.: 18/593,797

(22) Filed: Mar. 1, 2024

(65) Prior Publication Data

US 2024/0295427 A1 Sep. 5, 2024

(30) Foreign Application Priority Data

Mar. 2, 2023 (EP) .................................... 23159781

(51) Int. Cl.
*G01G 1/24* (2006.01)
*G01G 21/22* (2006.01)

(52) U.S. Cl.
CPC ............... *G01G 1/24* (2013.01); *G01G 21/22* (2013.01)

(58) Field of Classification Search
CPC ......... G01G 1/24; G01G 21/22; G01G 21/286
See application file for complete search history.

(56) References Cited

U.S. PATENT DOCUMENTS 4,977,969 A * 12/1990 Leisinger ............. G01G 23/012 73/1.13
7,012,198 B2 * 3/2006 Ludi .................... G01G 23/012 73/1.13
7,227,087 B2 * 6/2007 Luechinger ............ G01G 21/28 177/180

(Continued)

FOREIGN PATENT DOCUMENTS

CN 202221337 U 5/2012
CN 106093301 A 11/2016

(Continued)

*Primary Examiner* — Natalie Huls

(74) *Attorney, Agent, or Firm* — Standley Law Group LLP; Jeffrey S. Standley; Adam J. Smith

(57) ABSTRACT

A weighing device includes at least one weight preparation table and a weighing pan functionally connected to a load cell. Where the at least one weight preparation table and the weighing pan are displaceable, plurality in a linear translational displacement, relative to each other in a purely linear translational displacement along at least a horizontal axis and a vertical axis. The at least one weight preparation table is positionable in at least two different positions relative to the weighing pan in the horizontal displacement, including a first position where the at least one weight preparation table is laterally offset from a center of the weighing pan in a vertical view, and a second position where the at least one weight preparation table overlaps the center of the weighing pan in the vertical view. The weighing pan and the at least one preparation table are enclosed within a weighing chamber of the weighing device, where the weighing device restricts any motion of the at least one weight preparation (Continued)

table, and of the weighing pan to within the weighing chamber. Further disclosed are a system comprising the weighing device and a method for weight determination.

14 Claims, 6 Drawing Sheets

(56) References Cited

U.S. PATENT DOCUMENTS

| | | | | |
|---|---|---|---|---|
| 2006/0021803 | A1* | 2/2006 | Iiduka | G01G 21/286 177/180 |
| 2019/0316953 | A1* | 10/2019 | Meister | G01G 21/22 |
| 2024/0295431 | A1* | 9/2024 | Egg | G01G 23/02 |

FOREIGN PATENT DOCUMENTS

| | | | | |
|---|---|---|---|---|
| CN | 106323438 | A | 1/2017 | |
| CN | 110553712 | A | 12/2019 | |
| CN | 111780850 | A | 10/2020 | |
| CN | 111792363 | A | 10/2020 | |
| CN | 114485890 | A * | 5/2022 | G01G 23/01 |
| DE | 102006031194 | B3 | 8/2007 | |
| EP | 1195584 | A1 * | 4/2002 | G01G 21/22 |
| EP | 2584325 | B1 | 3/2016 | |
| KR | 10-0844174 | B1 | 7/2008 | |

* cited by examiner

WEIGHING DEVICE WITH DISPLACEABLE PREPARATION TABLE

CROSS-REFERENCE TO RELATED APPLICATIONS

This application claims the benefit of European Patent Application No. EP 23159781.6 filed Mar. 2, 2023, the disclosures of which are hereby incorporated by reference as if fully restated herein.

TECHNICAL FIELD

The herein claimed invention relates to weighing devices, in particular balances, such as mass comparators, weighing systems comprising such a weighing device, and related weighing methods.

BACKGROUND ART

In certain applications related to the determination of weight it is found desirable to automate the transfer of objects to be weighed to and from the weighing pan. This is for one specific instance the case in applications comprising high precision mass comparator balances. In one application of this type of balances, at least one reference weight, in particular at least one of a set of reference weights, and a test weight are alternatingly and repeatedly weighed, so as to determine a mean value of the weight of the test weight and a standard deviation, which allows an accurate determination of the test weight. It will be appreciated that the alternating placement of the test weight and reference weight(s) on the weighing pan, and the thus also required removal of the weights from the weighing pan, gains efficiency through automation.

High precision balances furthermore have the weighing pan enclosed by a weighing chamber. A closed weighing chamber enclosing the weighing pan serves to reduce interferences to the measurement by interfering factors from outside, such as caused, for instance, by air movements or temperature fluctuations. Any opening of the weighing chamber may result in interferences and may require a certain waiting time after closing the weighing chamber to allow the interferences caused by opening the weighing chamber to subside. It may thus be found further desirable for the transfer of the weights to and from the weighing pan to occur inside a closed weighing chamber.

It may further be desirable that loading and unloading of objects onto the weighing pan is effected as smoothly as possible, so as to avoid inducing oscillations and vibrations of the weighing pan. The same requirement applies to the drive of a loading/deloading mechanism. For highest precision it may further be desirable that the placement of objects onto the weighing pan is as reproduceable as possible, in particular when repeated measurements are performed, as outlined above.

In other aspects, it may be found desirable to transfer a set of weights or objects simultaneously, for example weights of a set of reference weights.

CN 106323438 A describes a system in which a robotic transfer device is used to transfer weights between a weight warehouse, a transfer multi-station comprising a milligram group transfer station and a gram group transfer station, and a mass comparator set including a milligram mass comparator and a gram mass comparator. The robotic device allows for movement along three linear axes and further rotation around a rotational axis. Quite similar disclosure is found in CN 106093301. According to the teaching of KR 10-0844174, a robotic device is used to transfer object from an external magazine directly onto a balance. CN 110553712 A discloses a device in which a suspension appliance is used to transfer single weights between storage places and a balance. Per the teaching of CN 111780850 A, a weight is prepared on a transfer arm outside the weighing chamber. Transfer of the weight to and from the weighing pan requires opening a door of the weighing chamber. CN 202221337 U suggests an arrangement comprising a slide plate on a rail mechanism which enables the center of gravity of a weight on a weighing table to be adjusted. CN 111792363 A discloses a robot for placing objects onto a weighing pan. While it is suggested that the robot and the balance may be included inside an enclosure, the balance comprises a dedicated weighing chamber, whereby the robot and the weight storage are provided outside the dedicated weighing chamber. DE 10 2006 031 194 A suggests to use revolving magazines to load weighing pans.

SUMMARY OF INVENTION

It is an object of the herein disclosed subject matter to provide a device and method as initially mentioned. In more specific aspects, the herein disclosed subject matter shall improve the art and overcome certain of the above-mentioned drawbacks, or fulfil at least some of the above-mentioned requirements, respectively. In one aspect, placing an object on a weighing pan of a weighing device and subsequently removing the object shall be automated. In a more specific aspect, placing an object on a weighing pan of a weighing device and subsequently removing the object shall be enabled inside a closed weighing chamber without access to the weighing chamber from outside. In more specific aspects, repeated placing of an object or weight onto the weighing pan shall be highly reproduceable in terms of the placement of the object or weight on the weighing pan. In still a further specific aspect, it shall be enabled to simultaneously place and/or unload a set of multiple objects rather than placing each object of a set of objects to be weighted individually.

This is enabled by the device defined in claim 1 and the method set forth in the independent method claim. Further effects and advantages of the disclosed subject matter, whether explicitly mentioned or not, will become apparent in view of the disclosure provided below.

Thus, disclosed is, in one aspect, a weighing device comprising at least one weight preparation table and a weighing pan which is functionally connected to a load cell. The load cell may be located at least essentially above the weighing pan or may be located at a position laterally offset from that of the weighing pan. To the extent that the weighing pan is provided inside a weighing chamber, as is set forth in more detail below, the load cell may be located above the weighing chamber or besides the weighing chamber. Both arrangements yield specific advantages. The preparation table may also be referred to in the art as a "preparation area" (which shall not be mixed up with the preparation area referred to below in the present disclosure), "transfer pan" or "weighing lift". The at least one weight preparation table and the weighing pan are displaceable relative to each other along at least two linear axes, wherein a first one of the at least two linear axes is a horizontal axis and a second one of the at least two linear axes is a vertical axis. The displaceability is restricted to purely linearly translational displacement along the at least two linear axes. In particular, the at least one weight preparation table and/or the weighing pan therefore has/have only linear degrees of freedom. That is to say, in other words, an actuator device for displacing the at least one weight preparation table is adapted and configured to displace the at least one weight preparation table exclusively along at least two linear axes, but has no rotational axis to impose a movement, rotation, or pivoting on the at least one weight preparation table, and/or an actuator device for displacing the weighing pan is adapted and configured to displace the weighing pan exclusively along at least two linear axes, but has no rotational axis to impose a movement, rotation, or pivoting on the weighing pan.

The displacement along the first one of the at least two linear axes is a horizontal displacement and the displacement along the second one of the at least two linear axes is a vertical displacement. The skilled person will readily appreciate that a weighing device has a clear and unique top and bottom and thus a clear and unique up-down orientation. The terms "vertical" and "horizontal" are thus clearly defined orientations in the context of a weighing device, as well as top and bottom sides are clearly defined.

In embodiments, the relative displacement between the at least one weight preparation table and the weighing pan is a displacement along exactly two linear axes.

The horizontal displacement is such that the at least one weight preparation table is positionable at at least two different positions relative to the weighing pan. In a first one of the at least two different positions the at least one weight preparation table is laterally offset from a center of the weighing pan in a vertical view, i.e., non-overlapping the center of the weighing pan in a vertical view. In a second one of the at least two different positions, the at least one weight preparation table is overlapping the center of the weighing pan in the vertical view. The lateral offset from the center may be such that there is, in a vertical view, no overlap between the at least one weight preparation table and the weighing pan, or it may be such that there is still an overlap between the at least one weight preparation table and the weighing pan.

According to a first example, the horizontal displacement is such that there is, in a vertical view, an at least partial overlap between the at least one weight preparation table and the weighing pan in the first one of the at least two different positions and in the second one of the at least two different positions. In each one of the at least two different positions, this means in the first and second positions, an edge of the at least one weight preparation table has a horizontally measured distance from an edge of the weighing pan. In the first one of the at least two different positions, the horizontally measured distance of the edge of the at least one weight preparation table from the edge of the weighing pan is different than in the second one of the at least two different positions. The horizontally measured distance of the edge of the at least one weight preparation table from the edge of the weighing pan in the second one of the at least two different positions in particular embodiments is less than 50% of a width of the weighing pan, and may in more particular be 30% or less or 10% or less of the width of the weighing pan. The horizontally measured distance of the edge of the at least one weight preparation table form the edge of the weighing pan in the first one of the at least two different positions in particular embodiments is larger than 50% of the width of the weighing pan, and may in more particular be 70% or more or 90% or more of the width of the weighing pan. The width of the weighing pan, as used above, may in particular be measured parallel to the direction in which the horizontally measured distance of the edge of the at least one weight preparation table form the edge of the weighing pan is measured.

According to a second example, the horizontal displacement is such that the weight preparation table is positionable laterally offset from the weighing pan (first position) as well as at least partially overlapping the weighing pan (second position) in a vertical view. A laterally offset position of a/the weight preparation table from the weighing pan, in the latter examples, may in still more specific embodiments include a position in which there is no overlap between the weighing pan and a/the weight preparation table in a vertical view. Laterally offset from the weighing table shall thus in certain aspects be understood in the sense that there is no overlap between the weighing pan and a/the weight preparation table in a vertical view.

According to a third example, the first one of the at least two different positions of the at least one weight preparation table is at least one of (i) a weight preparation table loading and unloading position and (ii) a waiting position, and the second one of the at least two different positions of the at least one weight preparation table is a weighing pan loading and unloading position. In other words, the horizontal displacement may be such that the at least one weight preparation table can take a first horizontal position relative to the weighing pan and a second horizontal position relative to the weighing pan, wherein the first horizontal position is at least one of a weight preparation table loading and unloading position and a waiting position, and wherein the second horizontal position is a weighing pan loading and unloading position. A loading and unloading position is a position configured for placing an object on top and onto the at least one weight preparation table and the weighing pan, respectively. A waiting position is a position taken by the at least one weight preparation table during weight determination of an object placed on the weighing pan.

It shall be understood that the three above-mentioned examples may include specific combined embodiments in which characteristics of two or more of these examples may be combined, but may as well include specific embodiments in which they may be independent from each other.

In any case, the relative displacement of the at least one weight preparation table and the weighing pan is adapted and configured such that an object can be placed on top of and onto the weighing pan as well as it can be removed from the weighing pan and be placed lateral from the weighing pan, whereby the weight preparation table at the same time is a transport device for the object between these positions. The weighing pan and the at least one weight preparation table are enclosed within a weighing chamber of the weighing device, wherein the weighing device is configured to restrict any motion of the at least one weight preparation table and of the weighing pan that contributes to the relative displacement between the at least one weight preparation table and the weighing pan to within the weighing chamber In particular the at least one weight preparation table cannot move outside the weighing chamber. In particular, each range of motion of the at least one weight preparation table and/or of the weighing pan along each of the axes along which the at least one weight preparation table and, respectively, the weighing pan may be displaced may be restricted to within the weighing chamber. This can be achieved, for instance, while not limited to, in providing an end stop for the at least one weight preparation table and/or the weighing pan, by the design of an actuator for the weight preparation table and/or of an actuator for the weighing pan, and/or a control logic limiting the range of motion of the weight preparation table and/or the weighing pan.

In an embodiment, any motion of the at least one weight preparation table and the weighing pan may be restricted to within the weighing chamber.

A range of motion of a component, in particular the at least one weight preparation table or the weighing pan, may denote a maximum range the component may travel in any direction or, in other words, an envelope of the maximum travel of the component in any direction. This can be achieved, for instance, while not limited to, in providing an end stop for the component, by the design of an actuator for the component, and/or a control logic limiting the range of motion of the component.

In particular one of the following configurations for generating the mentioned relative displacement between the at least one weight preparation table and the weighing pan are preferred, although it is not ruled out that, in addition, a displacement, for example with respect to the weighing chamber, of the weighing pan along a horizontal axis contributes to or causes the relative horizontal displacement between the at least one weight preparation table and the weighing pan:

- Configuration A: The at least one weight preparation table displaces, for example with respect to the weighing chamber, along a horizontal axis and along a vertical axis, wherein the weighing pan does not displace, for example with respect to the weighing chamber, expect displacements related to weight determination.
  - In particular, any displacement of the weighing pan caused by loading an object onto or unloading an object from the weighing pan are considered as displacements related to weight determination. This means that, for example, movements related to off-center loading an object on the weighing pan, to removing an off-center loaded object from the weighing pan, and/or to off-center load correction are also covered by the term "displacements related to weight determination".
- Configuration B: The at least one weight preparation table displaces, for example with respect to the weighing chamber, along a horizontal axis only, and the weighing pan, in additional to displacements related to weight determination, displaces, for example with respect to the weighing chamber, along a vertical axis only.
- Configuration C: The at least one weight preparation table displaces, for example with respect to the weighing chamber, along a horizontal axis and along a vertical axis, and the weighing pan, in additional to displacements related to weight determination, displaces, for example with respect to the weighing chamber, along a vertical axis only.

In embodiments according to configuration A, the range of motion of the at least one weight preparation table, as mentioned, is adapted and configured such that an object can be placed on top of and onto the weighing pan as well as it can be removed from the weighing pan and be placed away, in particular lateral, from the weighing pan, whereby the weight preparation table at the same time is a transport device for the object between these positions.

Independent of the configuration for generating the relative displacement between the at least one weight preparation table and the weighing pan, the relative displacement may be such that the weight preparation moves away from the weighing pan after an object has been placed on top of and onto the weighing pan. In other words, the weighing device, specifically the at least one preparation table and the weighing pan, may be adapted and configured for a relative movement between the at least one weight preparation table and the weighing pan such that the at least one weight preparation table moves away from the weighing pan while letting an object on the weighing pan, this object having been placed onto the weighing pan by the relative movement of the at least one weight preparation table with respect to the weighing pan. In particular, the at least one weight preparation table may move to the position (first position) that is laterally offset from the center of the weighing pan, in particular to a position that is laterally offset from the weighing pan. Alternatively or in addition the at least one weight preparation table may move to a position that is horizontally offset from the weighing pan, in particular below the weighing pan, in particular below in a manner that there is no overlap between the at least one weight preparation table and the weighing pan in a horizontal view. Alternatively or in addition, the relative displacement between the at least one weight preparation table and the weighing pan may be such that the at least one weight preparation table can remove an object placed on the weighing pan, wherein the motion for the removal of the object may start at the position that is laterally offset and/or horizontally offset from the weighing pan, and wherein the motion for the removal of the object usually ends at the first one of the at least two different positions. The weighing device, in particular the at least one preparation table and the weighing pan, may be adapted and configured for allowing such a motion for removal.

In embodiments according to configuration A, it is the range of motion of the at least one weight preparation table that allows the at least one weight preparation table to take the positions disclosed in the previous paragraph. In embodiments according to configuration B or C, a range of motion of the weighing pan contributes or causes the relative motion along a vertical axis, this motion being needed for the at least one weight preparation table being able to take the positions disclosed in the previous paragraph.

A vertical relative displacement between the at least one weight preparation table and the weighing pan, this means a vertical range of motion of the at least one weight preparation table and/or of the weighing pan, may in particular be provided such that a top face of the at least one weight preparation table is positionable at a vertical position which is above a top face of the weighing pan as well as the top face of the at least one weight preparation table is positionable at a vertical position which is below the top face of the weighing pan.

The mentioned relative displacement between the at least one weight preparation table and the weighing pan, this means the relative horizontal displacement and the relative vertical displacement, in particular the related ranges of motion of the at least one weight preparation table and/or of the weighing pan, is in particular embodiments possible due to the restriction of the displaceability of the at least one weight preparation table and/or of the weighing pan to purely linear translational displacement in combination with a specific design of the weighing pan and the at least one weight preparation table. This design may comprise a multitude of parallel bars as described in detail further below.

Independent of the configuration for generating the relative displacement between the at least one weight preparation table and the weighing pan, a weight preparation table, in the sense as used in the framework of the present disclosure, may be used to provide, or prepare, an object or a set of objects to be jointly weighed inside the weighing chamber. In other words, a weight preparation table, in the sense as used in the framework of the present disclosure, is configured to receive not only a single object but also a plurality of objects, that is, at least two objects, on it, to concurrently transport the multitude of objects to the weighing pan for placing them on top of the weighing pan, and to remove them from the weighing pan. A selection of reference weights from a set of reference weights is an example of a plurality of objects.

It is noted that within the framework of the present disclosure the use of the indefinite article "a" or "an" does in no way stipulate a singularity nor does it exclude the presence of a multitude of the named member or feature. It is thus to be read in the sense of "at least one" or "one or a multitude of". However, referring to "the at least one" of a member shall be construed as referring to all of the at least one members, unless stated differently, whereas referring to "a" member out of at least one member shall be construed as referring to any one out of the at least one members. It is moreover noted that in the context of the present application the terms "bordering" and "adjacent" as well as "bordering" and "adjacent to" are considered as synonyms.

In exemplary embodiments, the weighing pan is a hanging weighing pan (also called "low-level pan"). In an embodiment, the weighing pan is suspended by a suspension structure at a position above a top face of the weighing pan. The suspension structure may more specifically be a suspension cradle. The weighing pan may be suspended by a suspension arrangement, in particular at a position at or near the ceiling of a weighing chamber in which the weighing pan is arranged. The weighing pan may be rigidly connected to the suspension structure, which itself is a rigid structure. That is, the functional unit consisting of the weighing pan and the suspension structure comprises no mobile or flexible joints which are intended to allow movements between the elements of said functional unit. The functional unit yields no intentionally purposefully incorporated elasticity or movability. The suspension structure is in particular configured to be supported by a suspension arrangement, examples of which are given below, which provides a pivot point for the functional unit consisting of the weighing pan and the suspension structure and from where the gravitational force induced by said functional unit consisting of the weighing pan and the suspension structure and any object placed on the weighing pan is transmitted to the load cell. One single pivot point, or point of attachment, may be provided by the suspension arrangement to suspend the hanging weighing pan from a chassis of the weighing device. Thus, a maximum degree of freedom of the hanging weighing pan relative to the chassis is achieved. The suspension arrangement may be configured to be selectively joined or separated, or, in other words, functionally coupled or functionally decoupled, such that load from the functional unit consisting of the weighing pan and the suspension structure may be selectively transmitted to the load cell, i.e., when the suspension arrangement is joined or functionally coupled, respectively, or not be transmitted to the load cell, i.e. the load cell be de-loaded, when the suspension arrangement is separated or functionally decoupled.

In more specific embodiments of embodiments according to any one of configurations A-C, the weighing device comprises at least two weight preparation tables, in particular exactly two weight preparation tables. Each of the weight preparation tables is displaceable along a horizontal axis, wherein the at least two weight preparation tables are displaceable along their horizontal axis, this means the horizontal axis along which a specific weight preparation table of the at least two weight preparation tables is displaceable, independently form each other. Again, these displaceabilities, this means the displaceability of a first weight preparation table of the at least two weight preparation tables along its horizontal axis, the displaceability of a second weight preparation table of the at least two weight preparation tables along its horizontal axis and so on, if there are more than two weight preparation tables, are restricted to purely linearly translational displacements. As noted above, this shall be understood such that an actuator device or actuator devices for displacing the weight preparation tables is/are adapted and configured to displace the at least two weight preparation tables exclusively along their linear horizontal axis, but has/have no rotational axis to impose a rotation or pivoting movement around a rotational axis on the at least two weight preparation tables. Again, the weighing device is configured to restrict the range of motion of each of the weight preparation tables to within the weighing chamber. A first one of the at least two weight preparation tables is horizontally displaceable on a first lateral side of the weighing pan and a second one of the at least two weight preparation tables is horizontally displaceable on a second lateral side of the weighing pan. The second lateral side of the weighing pan may for instance be opposite the first lateral side of the weighing pan. In particular embodiments, the respective horizontal axes along which the first and second weight preparation tables are displaceable may be parallel to each other and in more particular embodiments be identical. In additional, in embodiments according to configuration A or C, the respective vertical axes along which the first and second weight preparation tables are displaceable may be parallel to each other and in more particular embodiments be identical.

In embodiments, independent of the configuration for generating the relative displacement between the at least one weight preparation table and the weighing pan, the weighing device may comprise a balance, in particular a comparator balance. In more specific embodiments, the weighing device is a balance, in particular a mass comparator balance. The balance is usually an automated balance due to the automated displaceability of the at least one weight preparation table and/or of the weighing pan. However, the weighing device according to these embodiments is no weighing system comprising, for example, a robotic device and/or a storage area (also called "magazine") for objects to be weighed. Rather, the weighing device may be the balance of such a system by integrating it in the system.

In particular, the previously and hereinafter mentioned weighing chamber is the weighing chamber of the balance. The previously and hereinafter mentioned weighing chamber is not a chamber for the weighing system, for example a chamber that accommodates the weighing system or its main elements, such as the weighing device, a robotic device, a storage area etc.

Generally, the weighing chamber, as is familiar to a person having skill in the art, may comprise at least an upright wall, for example an upright front wall, and at least one outer door, for example a lateral outer door. The upright wall may in particular extend generally at least essentially parallel to a horizontal displacement axis of the relative displacement between the weighing pan and the at least one weight preparation table. The at least one outer door, at least in a closed state, constitutes a confinement of the weighing chamber and is in particular positioned across said horizontal direction of any motion of the at least one weight preparation table and of the weighing pan that contributes to the relative displacement between the at least one weight preparation table and the weighing pan, and more in particular may be positioned at least essentially perpendicular to said horizontal direction of motion. The at least one outer door enables access to the interior of the weighing chamber such that objects may be placed into and removed from the weighing chamber. It will thus be appreciated that an end position of horizontal travel of at least one weight preparation table, or an edge thereof, respectively, is provided proximate or adjacent to the at least one outer door. Thus, when the at least one outer door is opened, objects may be placed onto and/or removed from said at least one weight preparation table through the open outer door. Any motion of the at least one weight preparation table and of the weighing pan that contributes to the relative displacement between the at least one weight preparation table and the weighing pan is limited at the latest when an edge thereof reaches the position of the at least one outer door when in a closed state. While in some embodiments the weighing chamber may comprise an outer door at one end while being closed by a fixed wall at another, in particular opposite, end, in other embodiments the weighing chamber may comprise an outer door at two ends, in particular two opposite ends, so that objects may be placed inside and/or removed from the weighing chamber from both ends of the weighing chamber. For example, the weighing chamber may comprise an outer door that is a lateral outer door and an upright front wall. In this case, an end of the weighing camber that is opposite to the lateral outer door may be closed by a fixed lateral wall or by a second lateral outer door. In more specific embodiments, at least one inner door may be provided which is arranged and configured to selectively subdivide the weighing chamber into an inner compartment and at least one outer compartment. At least one of the at least one inner door is arranged and configured to be positioned between the weighing pan in its weighing position and at least one of the at least one outer door when both of the mentioned doors, i.e. the at least one of the at least one outer door and the respective inner door, are in a closed state, and thus subdivide the weighing chamber into an inner compartment which includes the weighing pan and an outer compartment between the outer door and the respective inner door. Also the at least one inner door may in particular be positioned across said horizontal direction of any motion of the at least one weight preparation table and of the weighing pan that contributes to the relative displacement between the at least one weight preparation table and the weighing pan, and more in particular may be positioned at least essentially perpendicular to said horizontal direction of motion. The weighing chamber may be designed such that walls of the inner compartment that are not formed by an inner door correspond to walls of the outer compartment, in particular outer walls of the weighing chamber. This shall not rule out that a wall of the inner compartment that is essentially formed by an inner door may comprise non-movable elements for a better closure of the inner compartment when the inner door is in a closed state. For example, the at least one outer door may be an above mentioned lateral outer door and the at least one inner door may be a correspondingly arranged lateral inner door. There might be two inner doors provided and arranged and configured to subdivide the weighing chamber on different sides, in particular opposite sides, for example either lateral side, of the weighing pan. In embodiments comprising two inner doors, the two inner doors may be arranged and configured to subdivide the weighing chamber into the inner compartment and two outer compartments, the two outer compartments arranged on different sides, in particular opposite sites, for example either lateral side, of the weighing pan. In embodiments, the at least one inner door may be arranged and configured such that the subdivision is effected adjacent the weighing pan in its weighing position and thus to minimize the size of the inner compartment. In embodiments, in which the horizontal displacement is such that the at least one weight preparation table is positionable laterally offset from the weighing pan the at least one inner door may be arranged and configured to subdivide the weighing chamber between the weighing pan in its weighing position and the laterally offset positioned at least one weight preparation table. It is thus possible to subdivide the weighing chamber into an inner compartment comprising the weighing pan in its weighing position and at least one outer compartment, wherein the at least one weight preparation table is positionable outside the inner compartment and in at least one of the at least one outer compartment. That is, if the weighing device comprises two or more weight preparation tables, in certain embodiments, a first one of the at least one weight preparation table may be positioned in a first outer compartment on a first side, for example a first lateral side, of the inner compartment and a second weight preparation table of the at least one weight preparation table may be positioned in a second outer compartment on a second side, for example a second lateral side, of the inner compartment opposite the first side of the inner compartment. Evidence has shown that measurement accuracy is still further beneficially affected in subdividing the weighing chamber as described above, whereby the weighing pan is located during weighing inside a compartment having reduced size.

In an embodiment, in particular in an embodiment in which the weighing device is a balance, the weighing chamber of the weighing device is designed such that there is no space for transferring, manually or in an automated manner, an object from outside the weighing chamber onto the weighing pan without using the at least one weight preparation table and with a repeatability of sufficient precision.

In addition or alternatively, the elements of the weighing device enclosed by the weighing chamber may be restricted. In particular, the elements enclosed by the weighing chamber may be restricted to elements of the balance in embodiments in which the weighing device is a balance, in particular an automated balance. For example, the elements enclosed by the weighing chamber of the weighing device (of the balance, as the case may be) may be restricted to the at least one weight preparation table, the weighing pan, a suspension structure for the weighing pan, an actuation and guide mechanism for the at least one weight preparation table, and, if present, the above-mentioned at least one inner door of the weighing. The at least one weight preparation table and the suspension structure of the at least one weight preparation are adapted and configured to enable displacement of the at least one weight preparation table along a horizontal axis, at least. This horizontal axis is usually the horizontal axis along which the at least one weight preparation table and the weighing pan are displaceable relative to each other. It goes without saying that small parts usually present in the weighing chamber of a weighing device (of the balance, as the case may be), such as fixation elements (screws, mechanical guides etc.), sensors etc., may be further enclosed by the weighing chamber of the weighing device. Said small parts are summarizingly referred to as stationary parts. It goes further without saying that the weighing chamber is designed to enclose the object or objects to be weighed placed on the at least one weight preparation table and/or the weighing pan.

Optionally, a locking mechanism (also called locking device, in the following) adapted and configured to selectively fixing the position of the weighing pan with respect to a housing or chassis of the weighing device, may further be enclosed by the weighing chamber. This locking mechanism is described in detail further below.

As mentioned above, the weighing pan may be a hanging weighing pan (also called "low-level pan"). In an embodiment, the weighing pan is suspended at a suspension location which is positioned above a top face of the weighing pan. More in particular, the weighing pan may be suspended at a position at or proximate the ceiling of the weighing chamber. It is understood that the ceiling is a top wall of the weighing chamber. The weighing pan may be suspended at a suspension axle.

The weighing device may further comprise a locking mechanism which is adapted and configured for selectively locking the position of the weighing pan with respect to a housing of the weighing device. Such a locking mechanism may serve to inhibit movements of the weighing pan when placing an object or objects thereupon and/or removing an object or objects therefrom, thus improving precise and reproduceable placing of objects on the weighing pan. It shall be understood that a locking mechanism, in the sense used herein, defines over a simple stop mechanism, but is an active mechanism for capturing and locking the weighing pan, such as a gripping mechanism, and may for instance comprise at least one arm which is pivoted on a base or housing of the weighing device and configured to selectively engage a counterpart structure of the weighing pan.

In embodiments comprising the locking mechanism, the weighing pan may be locked relative to the housing in a direct or indirect manner. This means, the locking mechanism may act directly on the weighing pan, for example engage directly with the weighing pan, or the locking mechanism may act on, for example engage with, an element that is connected with the weighing pan. In particular, the locking mechanism may act on, for example engage with, the suspension structure according to any embodiment disclosed. In this case, said element may be rigid (stiff, inflexible, solid) and the connection between said element and the weighing pan may be rigid (stiff, inflexible, solid), too. Further, the weighing pan itself may be (stiff, inflexible, solid).

In particular, while non-limiting embodiments the locking device (locking mechanism) may be adapted and configured to, in addition to fixing the weighing pan, selectively lift and at least partially support the weighing pan and decouple the weighing pan from the load cell. At least partially support the weighing pan and decouple the weighing pan from the load cell shall be understood in the sense that in some embodiments the locking device, or at least one component of the locking device, may lift the weighing pan such that the weighing pan is completely detached from the load cell, while in other embodiments only a part of the gravitational force acting on the load cell when the weighing pan is functionally coupled to the load cell is taken over by the locking device, while another part of said gravitational force still acts on the load cell. For instance, a point of attachment, which may form a pivot point and at which a first bearing body fixedly attached to the weighing pan is, for functional coupling of the weighing pan and the load cell, supported by a second bearing body fixedly attached to the load cell can be completely separated and mechanically disconnected by lifting the first bearing body from the second bearing body. In other instances, as noted above, it might be the case that the locking device takes over only part of the weight from the load cell. For providing said support and effecting the lifting, the locking device, or at least one component of the locking device, may act directly onto the weighing pan or any structure fixedly attached to the weighing pan, like, e.g., the support structure of a hanging weighing pan. In other words, the locking device is configured to selectively lift and at least partially support the weighing pan and decouple the weighing pan from the load cell either in a direct or indirect manner. The foregoing also means, that the weighing pan then is not only be horizontally fixed by the locking device, but is also, at least partially, directly or indirectly, supported by the locking device, rather than being directly or indirectly supported by, or in embodiments, suspended from the load cell. The support arrangement for the weighing pan which transmits forces to the load cell and which supports the weighing pan during measurements is within the framework of the present disclosure also referred to as the "functional support". Supporting the weighing pan by the locking device, in addition to horizontally fixing the weighing pan, may yield various advantageous effects. For one thing, forces acting on the weighing pan during loading and unloading of the weighing pan do not act on sensitive elements of the weighing device participating in the weighing process, e.g., the load cell and certain elements transferring forces from the weighing pan to the load cell. Introducing forces, shocks, vibrations etc. into these elements is hence significantly reduced, if not avoided. For another thing, the weighing pan may be more precisely positioned for placing objects thereon. This improves reproducibility of the positioning of objects on the weighing pan and thus even further increases reproducibility and precision of measurements. The weighing pan, as outlined above, may be lifted to an extent by which the weighing pan is mechanically disconnected from the sensitive elements of the weighing device participating in the weighing process, in particular from the load cell. The coupling of the weighing pan to the load cell may involve a releasable point of attachment which may be disconnected by lifting the weighing pan and reconnected by lowering the weighing pan again. It may be found advantageous if supporting the weighing pan on the locking device or lifting the weighing pan is effected before horizontally fixing the weighing pan.

In more particular examples of the aforementioned embodiment, this means of the embodiment in which the locking device is configured to selectively lift and at least partially support the weighing pan and decouple the weighing pan from the load cell of the weighing device, wherein, according to these more particular examples the weighing pan is a hanging weighing pan that is suspended by a suspension structure, the weighing device comprises a suspension arrangement according to any embodiment disclosed and to which the suspension structure links and which is configured to functionally couple the weighing pan to the load cell, wherein the locking device comprises a lifting gear which is arranged and configured to selectively lift and support the suspension structure, thus decoupling the weighing pan from the load cell.

For example, the suspension structure may comprise a transversely extending section which extends at least partially in a horizontal direction. The transversely extending structure may in embodiments be a crossbar extending between two longitudinal bars or other longitudinally extending structures linking to the weighing pan. The transversely extending section links to the suspension arrangement which is configured to functionally couple the weighing pan to the load cell. For instance, the transversely extending section may be fixedly attached to a first bearing body. Said first bearing body accordingly is, through the suspension structure, fixedly linked to the weighing pan. Said first bearing body is configured and intended to be, for functional coupling of the weighing pan to the load cell, supported by a second bearing body fixedly linked to the load cell. The locking device according to this exemplary embodiment comprises the lifting gear which is configured to selectively lift and support the suspension structure, thus decoupling the weighing pan from the load cell. The locking device may for instance act on the transversely extending section. For instance, the point of attachment formed between two bearing bodies to functionally couple the weighing pan to the load cell can be completely separated and mechanically disconnected from the second bearing body by thus lifting the transversely extending section to which the first bearing body is fixedly attached. In still more specific embodiments, the lifting gear may comprise means which allow to receive the transversely extending structure in a well-defined unique position, thus locking the weighing pan in a well-defined unique position relative to the housing or chassis of the weighing device. The skilled person is readily aware of ample ways to achieve such mutually fitting of two members.

In exemplary, non-limiting embodiments and independent of the configuration for generating the relative displacement between the at least one weight preparation table and the weighing pan, the weighing pan and the at least one weight preparation table each comprise a multitude of parallel bars with voids between each pair of neighbouring bars. Upper edges of the bars of the weighing pan form a top face of the weighing pan and upper edges of the bars of the at least one weight preparation table form a top face of the at least one weight preparation table. The top face of the weighing pan and/or the at least one weight preparation table may in particular instances be flat and levelled. The voids between neighbouring bars are open at the respective top side. The bars of the weighing pan and the bars of the at least one weight preparation table extend parallel to each other, and in more particular embodiments parallel to one horizontal displacement axis. The dimension and arrangement of the bars of the weighing pan and the bars of the at least one weight preparation table are configured such that the weighing pan and the at least one weight preparation table are superimposable by receiving bars of any one of the at least one weight preparation table in the voids between neighbouring bars of the weighing pan and receiving bars of the weighing pan in the voids between neighbouring bars of the respective one of the at least one weight preparation table. Superimposable, in this respect, shall mean that the weighing pan and a weight preparation table may interpenetrate each other in that bars or beams of the weighing pan and the respective weight preparation table are mutually received within the voids between neighbouring bars or beams of the counterpart member. The weighing pan and the at least one weight preparation table are configured for the respective weight preparation table to be positionable with the top face of the respective weight preparation table lower than the top face of the weighing pan while the weighing pan and the respective one of the at least one weight preparation table are superimposed. For example, the weighing device, specifically the at least one weight preparation table and the weighing pan, may be configured such that any of the at least one weight preparation tables is able to carry out a, relative as the case may be, vertical displacement that results in its top face being lower than the top face of the weighing pan while the weighing pan and the respective one of the at least one weight preparation table are superimposed. It may be provided that a height, i.e., vertical dimension, of the bars of the at least one weight preparation table and a clear height of the voids between the neighbouring bars of the weighing pan are dimensioned such that, when the weighing pan and any one of the at least one weight preparation table are superimposed, i.e. interpenetrate each other, the respective weight preparation table is positionable with its top face lower than the top face of the weighing pan.

In more specific embodiments, the at least one weight preparation table and the weighing pan are displaceable relative to each other along a vertical linear displacement axis and along exactly one horizontal linear displacement axis. The vertical linear displacement axis is usually the vertical axis along which the at least one weight preparation table and the weighing pan are displaceable relative to each other, and the exactly one horizontal linear displacement axis is usually the horizontal axis along which the at least one weight preparation table and the weighing pan are displaceable relative to each other. In said embodiment, it may in particular be provided that the bars of the weighing pan and the bars of the weight preparation table extend parallel to the exactly one horizontal linear displacement axis, and, in a view along the exactly one horizontal linear displacement axis, each bar of the at least one weight preparation table is arranged either in registry with a void between two neighbouring bars of the weighing pan or lateral of the weighing pan. Further, each bar of the at least one weight preparation table is dimensioned to fit within the void between two neighbouring bars of the weighing pan with which it is in registry. Optionally, each bar of the at least one weight preparation table may have a height which is smaller than the clear height of the void between two neighbouring bars of the weighing pan with which it is in registry.

Further disclosed is a system comprising a weighing device according to any type or embodiment described above, a robotic device, and at least one of a preparation area and a storage area, such as a magazine for objects to be measured, wherein the robotic device, the storage area, if present, and the preparation area, if present, are provided outside the weighing chamber of the weighing device. However, the robotic device, the storage area, if present, and the preparation area, if present, may be provided inside a separate enclosure enclosing the robotic device, the storage area (if present), the preparation area (if present) and the weighing device with its weighing chamber. The separate enclosure may be an enclosure of the system. The robotic device is adapted and configured to move an object from the storage area or the preparation area, whatever is present and forms a pick-up and place-down position for an object to be moved into the weighing chamber by the robotic device, into the weighing chamber and onto one of the at least one weight preparation table and to remove an object from said weight preparation table and the weighing chamber and place it in the storage area or on the preparation area. A weight preparation table onto which an object is moved and from which an object is removed by the robotic device is in particular in the above-mentioned first one of the at least two different positions, which is at least in this case a weight preparation table loading and unloading position, that may further be a waiting position of the weight preparation table. It is understood that the robotic device is not configured and intended to directly place an object or objects from the storage area or the preparation area on the weighing pan. It is understood further that the robotic device is a device different from and in addition to the at least one weight preparation table of the weighing device, and that the storage area, if present, and the preparation area, if present, is/are different from and in addition to the at least one weight preparation table of the weighing device.

In another aspect, disclosed is a method for weight determination. The method comprises providing a weighing pan inside a weighing chamber, wherein the weighing pan is functionally connected to a load cell, and providing a weight preparation table, i.e., providing at least one weight preparation table, inside the weighing chamber. The weight preparation table is provided in a first position relative to weighing pan, wherein in the first position the weight preparation table is laterally offset from a center of the weighing pan in a vertical view. At least one object to be weighed is provided on a top face of the weight preparation table. The top face of the weight preparation table is provided at a vertical position higher than a top face of the weighing pan. The method further comprises displacing horizontally the weight preparation table and the weighing pan relative to each other until the weight preparation table takes a second position relative to the weighing pan, wherein in the second position the weight preparation table overlaps the center of the weighing pan, in a vertical view, and in particular until the at least one object to be weighed, i.e. all objects provided on the weight preparation table, is or are located above the top face of the weighing pan. Again, the relative horizontal displacement of the weight preparation table and the weighing pan may be caused by a horizontal movement of the weight preparation table, for example with respect to the weighing chamber, and/or by a horizontal movement of the weighing pan, for example with respect to the weighing chamber. However, in preferred embodiments, it is only the weight preparation table that moves horizontally, for example with respect to the weighing chamber, while the weighing pan does not move horizontally, expect movements related to weight determination, including movements of the weighing pan after off-center loading an object on the weighing pan, movements of the weighing pan after removing an off-center loaded object from the weighing pan, and/or movements of the weighing pan that are related to off-center load correction. In particular, preferred embodiments are according to any one of configurations A-C. Subsequently to the relative horizontal displacement, the weight preparation table and the weighing pan are displaced vertically relative to each other until the top face of the weight preparation table is at a vertical position lower than that of the weighing pan. Thereby, as will be readily appreciated, the at least one object to be weighed, i.e. all objects previously provided on the weight preparation table, is or are placed on the weighing pan. Again, the relative vertical displacement of the weight preparation table and the weighing pan may be caused by a vertical movement of the weight preparation table, for example with respect to the weighing chamber, and/or by a vertical movement of the weighing pan, for example with respect to the weighing chamber. In particular, any one of configurations A-C may apply. In particular, configuration A or B may apply. Optionally, for example in embodiments in which the at least one object to be weighed is removed from the weighing pan by a weight preparation table that is different from the weight preparation table used to place the at least one object to be weighed on the weighing pan or in embodiments in which it is considered beneficial to have no weight preparation table in close vicinity of the weighing pan during weight determination, the weight preparation table may be arranged horizontally away from the center of the weighing pan after placing the at least one object to be weighed on the weighing pan. In particular, the weight preparation table may be arranged in a position that is laterally offset from the weighing pan, such as the first position. Again, all displacements of the weight preparation table (if any) and of the weighing pan (if any) that contribute to the relative displacement between the weight preparation table and the weighing pan are purely linear displacements and are restricted to within the weighing chamber. Finally, a reading is taken from the load cell. Taking a reading from the load cell may be performed, for instance, by recording a measured signal from the load cell in a data acquisition system.

The first position and the second position may be according to any embodiment disclosed with respect to the weighing device.

The above-described method may in particular comprise involving, or be carried out in, a weighing device or system of any type outlined above. In particular, the method may comprise a step of providing a weighing device or a system according to any embodiment disclosed with respect to the weighing device or the system. Alternatively or in addition, any element used in the method may be according to any embodiment of the corresponding element disclosed with respect to the weighing device or the system. In particular, the weighing pan, the weighing chamber and the at least one weight preparation table may be according to any embodiment disclosed with respect to the weighing device or the system. Alternatively or in addition, the method may comprise, in embodiments, any step or combination of steps that relate(s) to features of elements of the weighing device and/or the system.

As known to the skilled person, high precision mass comparator balances may require the placement of multiple objects onto the weighing pan, for example to offset the weight of a test weight to match the measurement range of the balance and/or to assemble a specific mass of the reference weights from a set of individual reference weights. As outlined above, the herein disclosed weighing device is capable of simultaneously transferring multiple objects from a weight preparation table to a weighing pan and vice versa, and the herein suggested method simultaneously transfers multiple objects from a weight preparation table to a weighing pan and/or vice versa.

The method may further comprise, in particular, non-limiting instances, after a reading from the load cell has been taken, vertically displacing the weight preparation table and the weighing pan relative to each other, wherein the weight preparation table is in the second position and located below the at least one object to be weighed and wherein the top face of the weight preparation table is initially located at a vertical position lower than the top face of the weighing pan. This vertical displacement is carried out until the top face of the weight preparation table is at a vertical position above the top face of the weighing pan, thereby removing the at least one object to be weighed from the weighing pan and supporting the at least one object to be weighed on the weight preparation table. Subsequently, the weight preparation table with the at least one object to be weighed placed thereon and the weighing pan are displaced horizontally relative to each other until the weight preparation table is positioned in the first position. Again, all displacements of the weight preparation table (if any) and of the weighing pan (if any) that contribute to the relative displacement between the weight preparation table and the weighing pan are purely linear displacements and are restricted to within the weighing chamber.

The method may comprise a step of displacing horizontally the weight preparation table and the weighing pan relative to each other until the weight preparation table is in the second position while the top face of the weight preparation table is located at a vertical position lower than the top face of the weighing pan. The weight preparation table may be brought by this step in the mentioned location below the at least one object to be weighed.

In an embodiment, providing a weight preparation table comprises providing a first weight preparation table and providing a second weight preparation table. The first and second weight preparation table may be and arranged according to any embodiment of the weighing device comprising at least two preparation tables disclosed.

Further, the method may be performed such that during execution of the method, a first weight preparation table carries a first set of at least one object to be weighed and a second weight preparation table carries a second set of at least one object to be weighed. In this respect, a set of at least one object to be weighed shall explicitly be understood as including the case where only one object is provided; i.e., the set may comprise only one object. The above-described steps of placing at least one object from a weight preparation table onto the weighing pan, taking a reading from a load cell, and subsequently removing the at least one object from the weighing pan may be performed with the first weight preparation table, thereby determining the weight of the first set of at least one object to be weighed, and may subsequently be performed with the second weight preparation table, thereby determining the weight of the second set of at least one object to be weighed.

Alternatively, or in addition, the method may comprise a step of transferring at least one object initially placed on the first weight preparation table to the second weight preparation table via the weighing pan. Therefore, the method may comprise performing the above-described steps related to placing at least one object from a weight preparation table onto the weighing pan with the first weight preparation table and performing the above descripted steps related to removing the at least one object from the weighing pan with the second weight preparation table. The second weight preparation table may be in a location that is laterally offset from the weighing pan, for example in its first position, during the steps related to placing at least one object from the first weight preparation table onto the weighing pan, and the first weight preparation table may be in a location that is laterally offset from the weighing pan, for example in its first position, during the steps related to removing the at least one object from the weighing pan with the second weight preparation table.

The method according to any embodiment disclosed above may further include conveying at least one object to be weighed from outside the weighing chamber to within the weighing chamber and placing the at least one object onto a weight preparation table arranged inside the weighing chamber, for example the first weight preparation table, so as to provide the at least one object to be weighed on the weight preparation table. The weight preparation table onto which the at least one object is placed is in its first position during placement of the at least one object, in embodiments.

In an embodiment, the method comprises keeping the weighing chamber closed while performing the entirety of method steps of any method outlined above, except the optional step of conveying at least one object to be weighed from outside the weighing chamber to within the weighing chamber.

In an embodiment, the method comprises fixing the weighing pan relative to a housing or chassis of weighing device by a locking mechanism (locking device), in particular a locking mechanism according to any embodiment disclosed, prior to placing the at least one object to be weighed on the weighing pan, releasing the weighing pan after the at least one object has been placed on the weighing pan and prior to taking the reading from the load cell. The method according to this embodiment may further comprise fixing the weighing pan relative to the housing or chassis of the weighing device by the locking mechanism after the reading from the load cell has been taken and prior to removing the at least object to be weighed from the weighing pan.

It is understood that the features and embodiments disclosed above may be combined with each other. It will further be appreciated that further embodiments are conceivable within the scope of the present disclosure and the claimed subject matter which are obvious and apparent to the skilled person by virtue of the present disclosure.

BRIEF DESCRIPTION OF DRAWINGS

The subject matter of the present disclosure is now to be explained in more detail by means of selected exemplary embodiments shown in the accompanying drawings. The FIGURES show.

It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

The FIGURES refer to the above-discussed configuration A. It goes without saying that the claimed invention covers further configurations, in particular the configurations discussed above.

DESCRIPTION OF EMBODIMENTS

Figure 1:
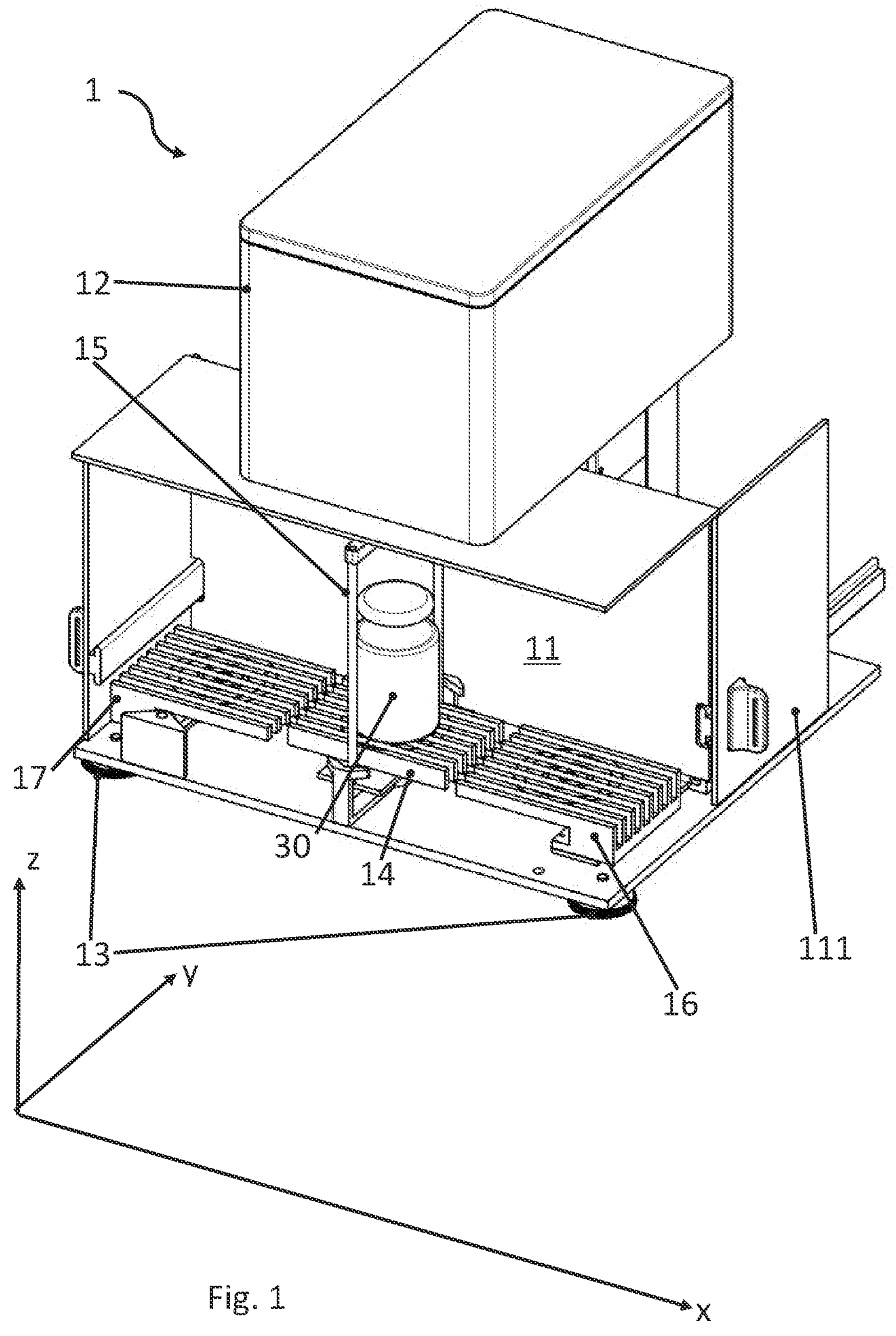
FIG. 1 an exemplary embodiment of a weighing device as herein suggested, with a front wall of the weighing chamber removed.
Figure 2:
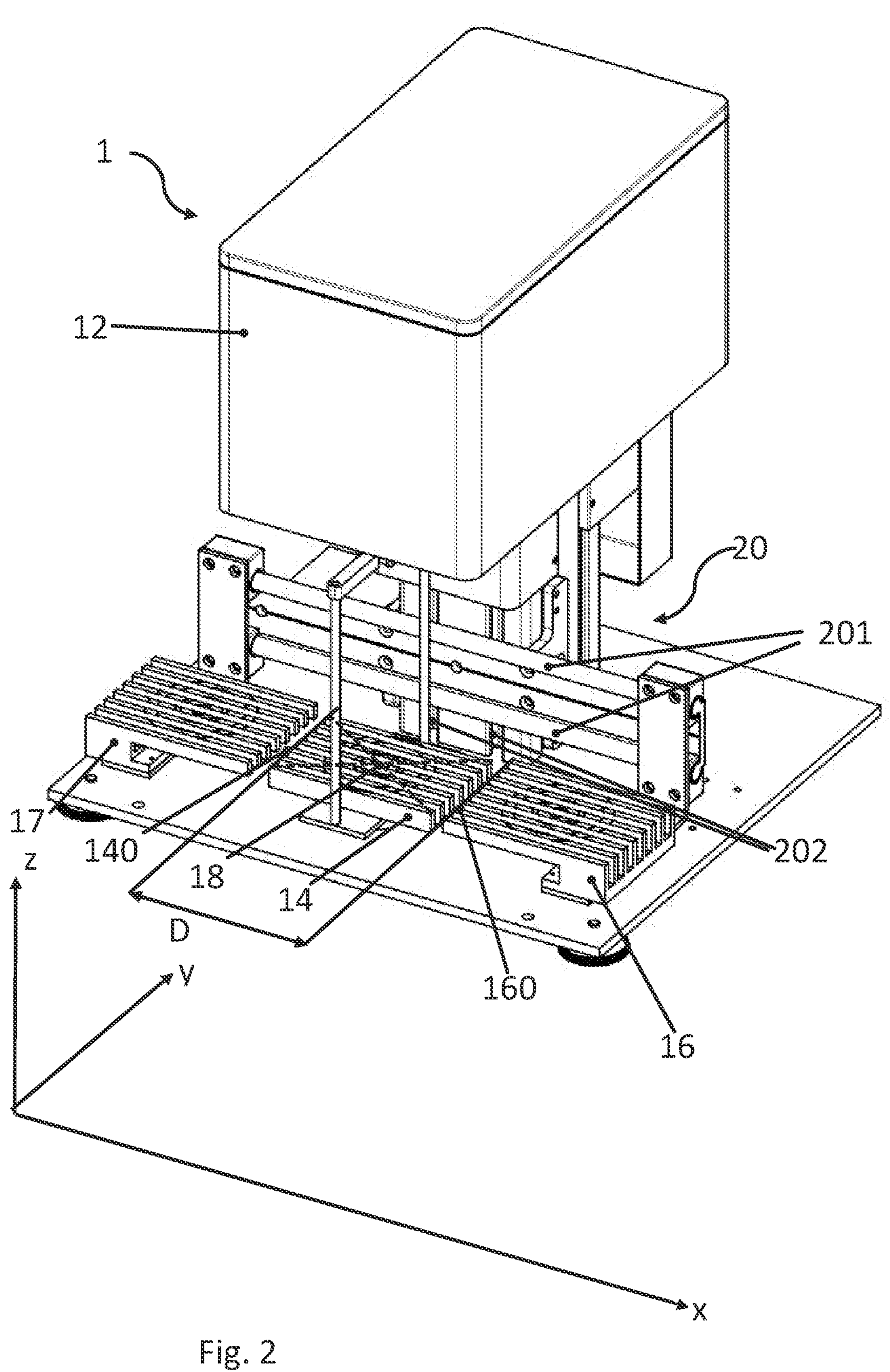
FIG. 2 the weighing device of FIG. 1 with the weighing chamber in its entirety being removed.
Figure 4:
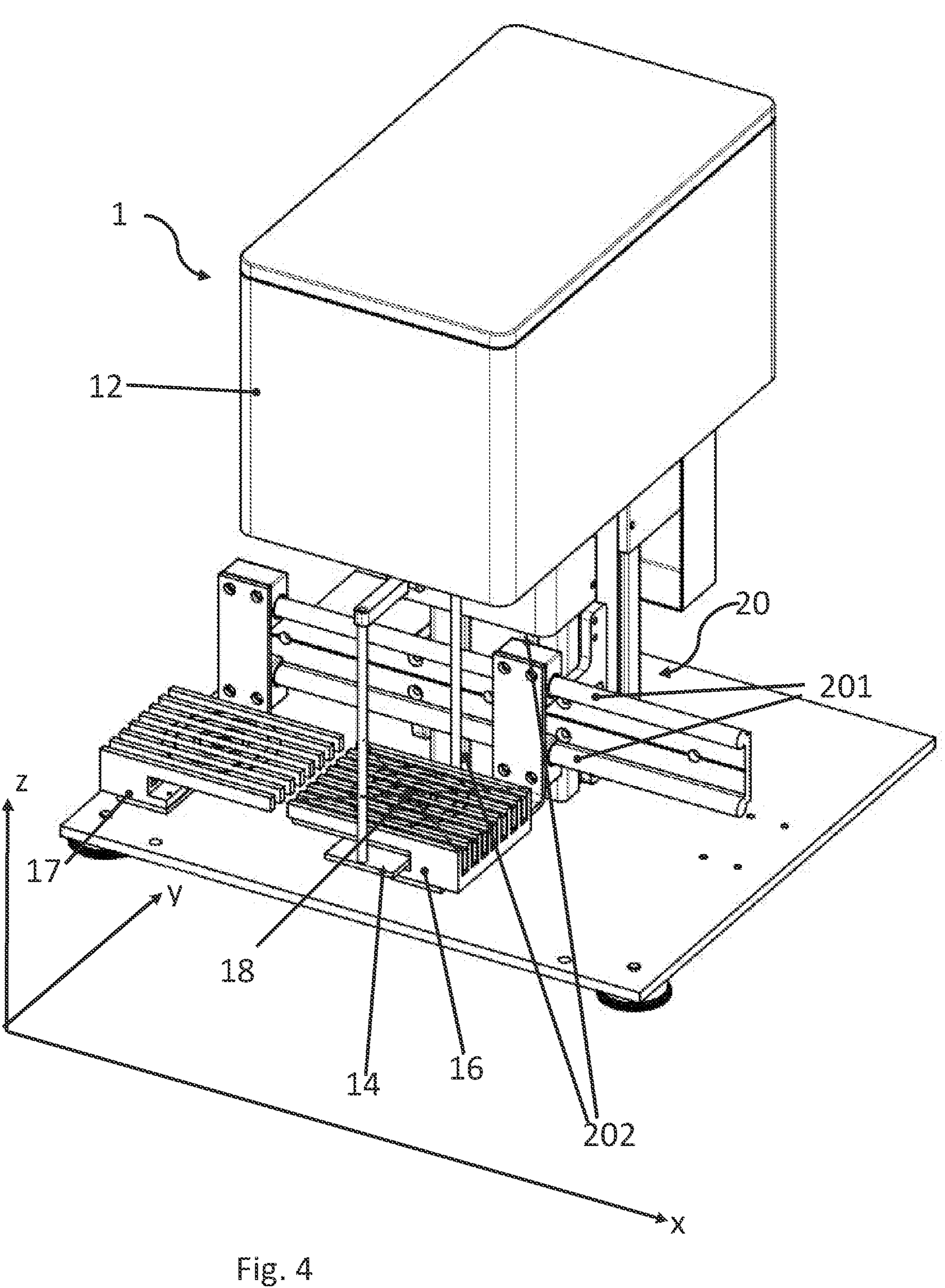
FIG. 4 the weighing device of FIGS. 1 and 2 with a weight preparation table in a different position than in FIGS. 1 and 2.

FIG. 1 outlines an exemplary, while non-nonlimiting, embodiment of the herein described weighing device. Weighing device 1 comprises weighing chamber 11 which is provided to protect mechanical measurement hardware from external interferences, like air draft, temperature changes and so forth. Generally spoken, weighing chamber 11 forms a closed volume inside which the measurement takes place. Weighing chamber 11 comprises weighing chamber door 111 which may be opened to allow access to the interior of weighing chamber 11, and transfer of objects into and out of weighing chamber 11, but shall generally be closed during measurements and, preferably, a certain time prior to measurements. As the skilled person will readily appreciate, a front wall of weighing chamber 11 has been omitted in the present depiction so as to allow a view onto the content of weighing chamber 11. Further, weighing device 1 comprises housing 12 which comprises, for instance, control and processing electronics. In the exemplary embodiment shown, housing 12 also comprises a load cell (not shown), which essentially is the transducer for transforming a physical signal depending on the measured weight to an electric signal. On the bottom of weighing device 1, weighing device 1 comprises feet 13. In any case, the structure of the weighing device clearly defines a top and a bottom of the weighing device. Thus, a vertical direction, represented by arrow z, is clearly defined with respect to the weighing device, and moreover top and bottom sides are clearly defined. Further, horizontal directions x and y may be defined, wherein "horizontal" is also clearly defined with respect to weighing device 1. Inside weighing chamber 11 weighing pan 14 and two weight preparation tables 16 and 17 are provided. Weighing pan 14 is functionally connected to the load cell which is arranged inside housing 12. This means that a force induced by an object, or weight, 30 respectively, which is placed on top of weighing pan 14, is transmitted to the load cell and is transformed into an electric signal by the load cell, as is well-known to the person having skill in the art. Weighing pan 14 has a center 18 that cannot be seen in FIG. 1 because object 30 is arranged on the weighing pan 14. The center 18 of the weighing pan 14 is shown in FIGS. 2 and 4. Weighing pan 14, in the exemplary embodiment, is a hanging weighing pan which is suspended, for instance, at or proximate to the ceiling of weighing chamber 11, through suspension structure 15. The balance of weighing device 1 is for instance a comparator balance which essentially compares the weight of a test object or multiple test objects, i.e., at least one test object or a set of at least one test object, to the weight of a reference weight or multiple reference weights, i.e., at least one reference weight or a set of at least one reference weight. In other aspects, entire weighing device 1 might be referred to as a balance. It is understood that the at least one test object may actually comprise only one object to be weighed plus one or more offset weights of a known weight so as to shift the total weight of objects to be measured into the measurement range of the balance. In order to increase accuracy of the measurements and assess the accuracy, it may be provided that the at least one test object and the at least one reference weight are repeatedly and alternatingly placed on weighing pan 14 and measurements taken. Each set of test weights or reference weights may be referred to as objects to be weighed. To this extent, the weight preparation tables 16 and 17 are provided inside weighing chamber 11. The test weights and reference weights, respectively, may be placed onto weight preparation tables 16 and 17 before taking the actual measurement and while weighing chamber door 111 is open. For instance, at least one test weight may be placed onto weight preparation table 16 as a first set of at least one object to be weighed, while at least one reference weight may be placed onto weight preparation table 17 as a second set of at least one object to be weighed. It is understood as well the at least one test weight may be placed onto weight preparation table 17 while the at least one reference weight may be placed onto weight preparation table 16. That is, the objects to be weighed are prepared on weight preparation tables 16 and 17. As will become apparent by virtue of the description below, weight preparation tables 16 and 17 are displaceable inside weighing chamber 11 and configured to place the respective sets of at least one object provided thereon onto weighing pan 14 as well as to remove the set of at least one object from weighing pan 14 while receiving them on the respective weight preparation table again. Said loading and unloading of the weighing pan may be effected in displacing the weight preparation tables in purely linear movements along horizontal axis x and vertical axis z, without applying a rotational or pivoting motion around a rotation or pivot axis. Thus, after providing the sets of at least one object to be weighed on the weight preparation tables 16 and 17, weighing chamber door 111 is and remains closed and the entire measurement process comprising repeated measurements can take place inside the closed weighing chamber and protected from external interferences.

Providing the objects to be weighed on the weight preparation tables 16 and/or 17 may in embodiments be effected by a robotic device arranged outside weighing chamber 11 and forming part of a system comprising weighing device 1. Said system, an example of which is outlined below, may also comprise a storage and/or preparation area for storing the objects to be weighed. Objects might be placed on weight preparation table 17, which is arranged relatively distal from weighing chamber door 111, via weighing pan 14, in that the objects are first placed onto weight preparation table 16, which is arranged relatively proximal to weighing chamber door 111, transferring the objects onto weighing pan 14 by weight preparation table 16, and subsequently removing the objects from weighing pan 14 by weight preparation table 17, thereby receiving the objects on weight preparation table 17. Likewise, as the skilled person will readily appreciate, objects might be transferred from weight preparation table 17 to weight preparation table 16 by transferring the objects onto weighing pan 14 from weight preparation table 17, and subsequently removing the objects from weighing pan 14 by weight preparation table 16. The objects may then be removed out of weighing chamber 17 in removing them weight preparation table 16, which is relatively proximal to weighing chamber door 111.

In FIG. 2, all walls of weighing chamber 11 are omitted for the sake of a view of actuation and guide mechanism 20 which allows displacement of weight preparation tables 16 and 17 for conveying objects to and away from weighing pan 14. Each of weight preparation tables 16 and 17 is displaceable along linear horizontal axis x and guided by horizontal linear guides 201. For instance, while performing a linear displacement along horizontal axis x, weight preparation table 16 takes different positions relative to weighing pan 14, in which an edge 160 of weight preparation table has different distances D from an edge 140 of weight preparation table 14. Weight preparation tables 16 and 17 are displaceable along horizontal linear guides 201 independent from each other. Horizontal linear guides 201 may include horizontal end stops which are configures such that the range of motion of weight preparation tables 16 and 17 in horizontal direction is limited to within the weighing chamber. Horizontal linear guides 201 in turn are guided in and are vertically displaceable along vertical linear guides 202. It is appreciated that displacement of horizontally linear guides 201 along vertical linear guides 202 results in displacement of weight preparation tables 16 and 17 along vertical axis z.

Figure 3:
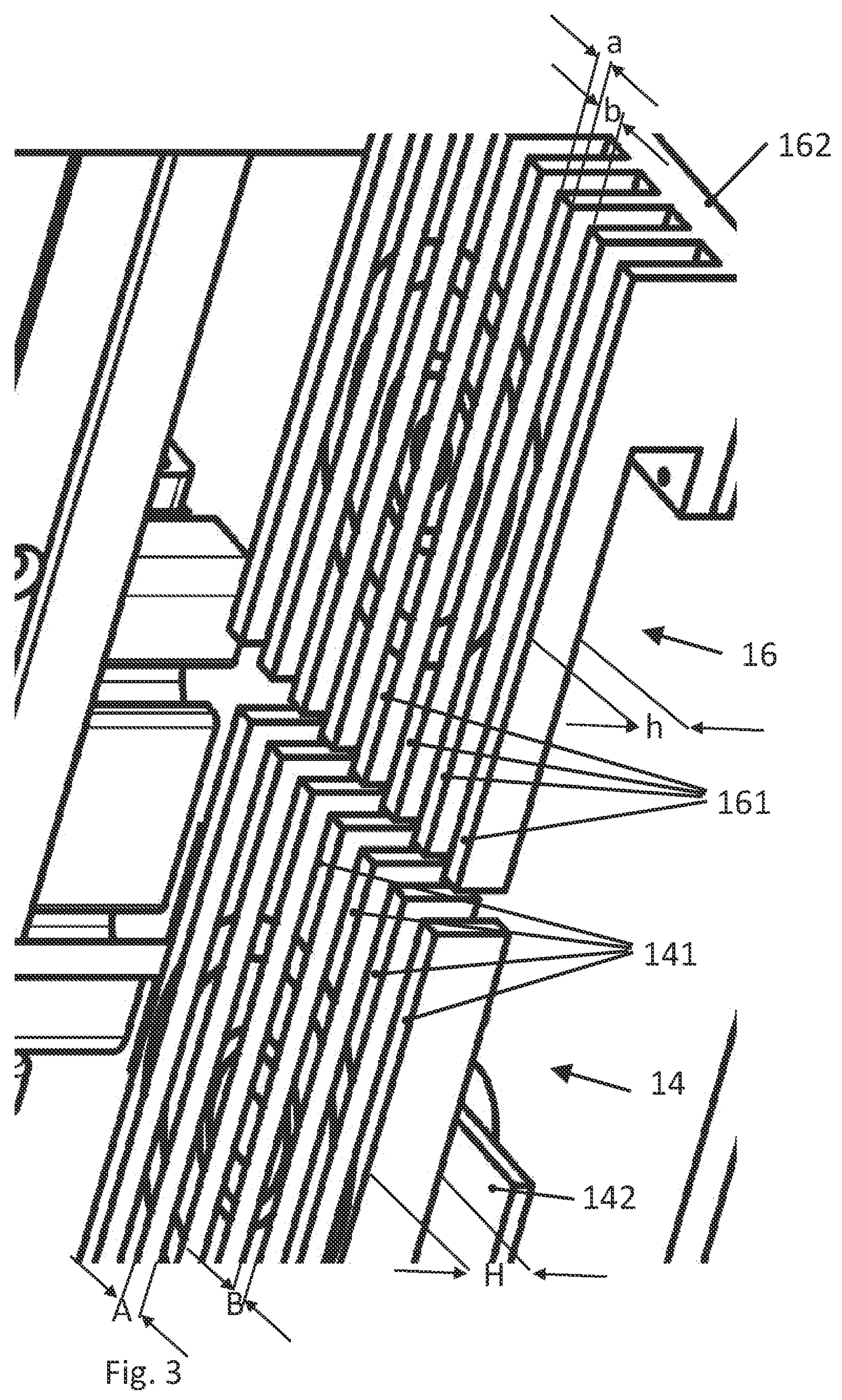
FIG. 3 a detail of the weighing device of FIGS. 1 and 2, illustrating details of the weighing pan and a weight preparation table.

FIG. 3 outlines certain detail of weighing pan 14 and weight preparation table 16 of the present non-limiting embodiment. It shall be understood that any statement made with respect to weight preparation table 16 also applies to weight preparation table 17. Weighing pan 14 comprises bars 141 which are arranged on a base plate 142. Weight preparation table 16 comprises bars 161 which cantilever from a base 162 and towards weighing pan 14. Bars 141 of weighing pan 14 are parallel to each other and parallel to bars 161 of weight preparation table 16. Bars 161 of weight preparation table 16 extend parallel to each other and parallel to bars 141 of weighing pan 14. Bars 141 of weighing pan 14 and bars 161 of weight preparation table 16 extend parallel to horizontal the linear guides 201 shown in FIG. 2, and hence parallel to the horizontal displacement axis of weight preparation tables 16 and 17, which, in the present embodiments, is denoted at x. The top edges of bars 141 of weighing pan 14 jointly form a top face of weighing pan 14. The top edges of bars 161 of weight preparation table 16 jointly form a top face of weight preparation table 16. Bars 141 of weighing pan 14 have a width A and are arranged with voids between each pair of neighbouring bars, wherein the width of the voids between neighbouring bars 141 is denoted B. The voids have a clear height H measured from the top of a bar 141 to the base plate 142 which, in the present non-nonlimiting embodiment, corresponds to height of the bars. Bars 161 of weight preparation table 16 have a width a and are arranged with voids between each pair of neighbouring bars, wherein the width of the voids between neighbouring bars 161 is denoted b. Bars 161 of weight preparation table 16 have a height h. The width B of the voids between neighbouring bars 141 of weighing pan 14 is dimensioned such that bars 161 of weight preparation table 16 can be received within the voids between neighbouring bars 141 of weighing pan 4. That is, in the presently shown exemplary embodiment, the width B of the voids between neighbouring bars 141 of weighing pan 14 is larger than the width of bars 161 of weight preparation table 16. Likewise, the width b of the voids between neighbouring bars 161 of weight preparation table 16 is dimensioned such that bars 141 of weighing pan 14 can be received in the voids between neighbouring bars 161 of weight preparation table 16. That is, in the presently shown exemplary embodiment, the width b of the voids between neighbouring bars 161 of weight preparation table 16 is larger than the width A of the bars 141 of weighing pan 14. Further, the bars 161 of weight preparation table 16 are, along the horizontal displacement axis of weight preparation table 16, aligned or in registry with the voids between neighbouring bars 141 of weighing pan 14, and the bars 141 of weighing pan 14 are, along the horizontal displacement axis of weight preparation table 16, aligned and in registry with the voids between neighbouring bars 161 of weight preparation table 16. Further, the height h of the bars 161 of weight preparation table 16 is smaller than the clear height H of the voids between neighbouring bars 141 of weighing pan 14. The vertical range of motion of weight preparation table 16 is provided such that the top edges of bars 161 of weight preparation table 16 may be placed above as well as below the top edges of bars 141 of weighing pan 14. That is, the top face of weight preparation table 16 may be placed vertically higher of lower than the top face of weighing pan 14, which is, due to the above-mentioned relative dimensions of the height h of bars 161 of the weight preparation table and the height H of the voids between neighbouring bars 141 of weighing pan 14, also possible when bars 161 of weight preparation table 16 are received in the voids between neighbouring bars 141 of weighing pan 14.

FIG. 4 illustrates a situation in which weight preparation table 16 has been horizontally displaced to overlap and actually interpenetrate with weighing pan 14. Referring to FIG. 3 in connection with FIG. 4, bars 161 of weight preparation table 16 are received in the voids between neighbouring bars 141 of weighing pan 14, and bars 141 of weighing pan 14 are received in the voids between neighbouring bars 161 of weight preparation table 16. Due to the geometric relationships outlined above, weight preparation table 16 can be vertically displaced along vertical guides 202 such that a top face of weight preparation table 16 may selectively be placed higher or lower than a top face of weighing pan 14 while weight preparation table 16 and weighing pan 14 interpenetrate each other, i.e., the bars of said members are mutually received within the voids between neighbouring bars of the respective other of said members. If weight preparation table 16, with an object, or a set of objects, placed thereupon, is displaced vertically downward from a position in which the top face of weight preparation table 16 is higher than the top face of weighing pan 14 to a position in which the top face of weight preparation table 16 is lower than the top face of weighing pan 14, the object which was or all objects which were initially provided on weight preparation table 16 are placed on weighing pan 14. Weight preparation table 16 may thereafter be horizontally displaced away from weighing pan 14 such that the bars 161 of weight preparation table 16 are moved out of the voids between neighbouring bars 141 of weighing pan 14. The object or the objects based upon weighing pan 14 may be weighed without weight preparation table 16 interfering with weighing pan 14. Likewise, if weight preparation table 16, with bars 161 of weight preparation table 16 received in the voids between neighbouring bars 141 of weighing pan 14, is displaced vertically upward from a position in which the top face of weight preparation table 16 is lower than the top face of weighing pan 14 to a position in which the top face of weight preparation table 16 is higher than the top face of weighing pan 14, an object or objects placed on weighing pan 14 is or are lifted from weighing pan 14 and supported on weight preparation table 16, and may subsequently be moved away from weighing pan 14 in horizontally displacing weight preparation table 16 away from weighing pan 14.

Actuation and guide mechanism 20 may include actuators configured to drive weight preparation tables 16 and 17 horizontally along guides 201, and further to drive horizontal guides 201 with weight preparation tables 16 and 17 attached thereto vertically along guides 202. Housing 12 may house control electronics for the control of the actuators.

Figure 5:
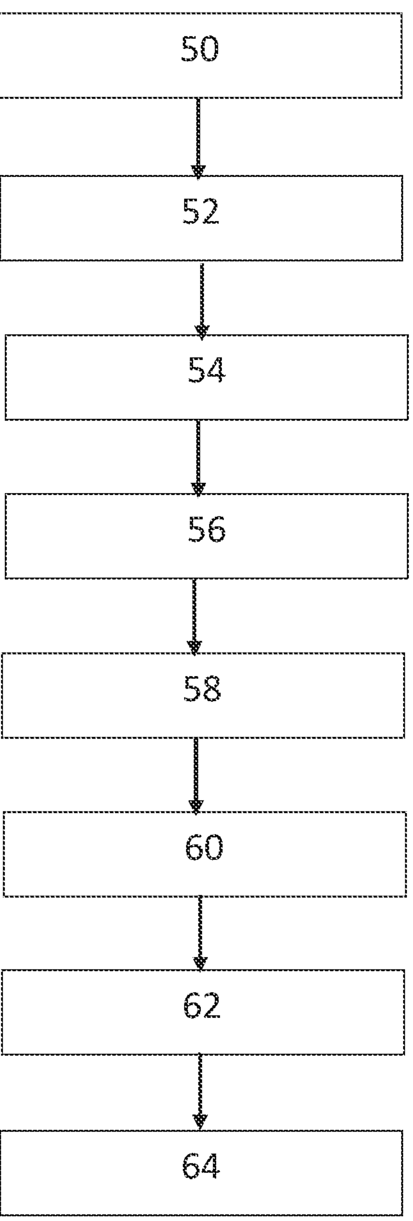
FIG. 5 a diagram outlining an exemplary embodiment of the herein suggested method.

FIG. 5 outlines a method as herein suggested, which may particularly be performed in applying a weighing device of the herein disclosed type, while not being limited to be performed on the specific type of weighing device. Thus, the weighing device may, in non-limiting embodiments, be the weighing device outlined in the exemplary embodiments above. At step 50, a weight preparation table with at least one object placed thereupon is positioned, in an exemplary instance, laterally offset from the weighing pan or laterally offset from a center of the weighing pan, with the top face of the weight preparation table being placed at a vertical position higher than the top face of the weighing pan. At step 52, the weight preparation table with the at least one object placed thereupon is displaced horizontally towards the center of the weighing pan until the weight preparation table overlaps the center of the weighing pan. At 54, the weight preparation table is displaced vertically downward until the top face of the weight preparation table is positioned lower than the top face of the weighing pan, thereby placing the at least one object onto the weighing pan. At 56, the weight preparation table is displaced horizontally away from the center of the weighing pan, in particular instances until the weight preparation table and the weighing pan are clear from each other and the weight preparation table is positioned lateral of the weighing pan. A weight reading of the at least one object may then be taken at 58 without the weight preparation table interfering with the weighing pan. Subsequently, at 60, the weight preparation table, with its top face being positioned lower than the top face of the weighing pan, is moved horizontally towards the center of the weighing pan until it interpenetrates with the weighing pan and overlaps the center of the weighing pan. At 62, the weight preparation table is displaced vertically upward until its top face is positioned higher than the top face of the weighing pan, thereby lifting the at least one object from the weighing pan and supporting the at least one object by the weight preparation table. At 64, the weight preparation table is displaced horizontally away from the center of the weighing pan until it is positioned, in instances, lateral from and clear of the weighing pan.

During steps 52 through 56 and steps 60 through 64, the weighing pan may be securely locked relative to a housing of the weighing device by a locking mechanism so that no swinging movement may be induced onto the weighing pan. The locking mechanism is then released prior to weight reading step 58 and the locking mechanism is again actuated to lock the weighing pan after a reading has been taken and before again actuating a weight preparation table.

Figure 6:
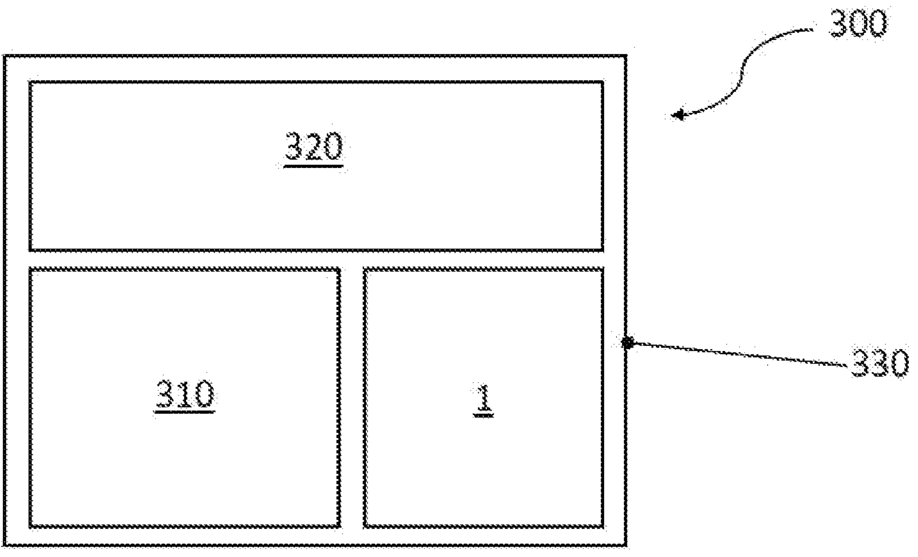
FIG. 6 an exemplary embodiment of a system including a weighing device as herein disclosed.

FIG. 6 depicts a system 300 comprising any weighing device 1 as outlined above, a storage and/or preparation area 310 on which the weight which, in instances, may be intended to be used during a measurement session are held available, and a robotic device 320. As outlined above, weighing device 1 comprises a weighing cell. System enclosure 330 encloses weighing device 1, storage and/or preparation area 310 and robotic device 320. As outlined above, weighing device 1 comprises a weighing chamber, wherein an enclosure enclosing the weighing chamber with the weighing pan and the at least one weight preparation table enclosed therein is different from enclosure 330. Storage and/or preparation area 310 and robotic device, however, are located outside of the weighing chamber. Robotic device 320 is configured to move weights between the storage and/or weight preparation area 310 and the interior of the weighing chamber. More specifically, robotic device 320 is adapted and configured to move weights from the storage and/or preparation area 310 onto a weight preparation table provided inside the weighing chamber, and to remove weights from the at least one weight preparation table and place them back to storage and/or preparation area. Robotic device 320 may be configured further to move weights and to combine different weights, for example on a weight preparation table or on a preparation area of the storage and/or preparation area, to form a set of weights on the weight preparation table inside the weighing chamber. A weight preparation table provided inside the weighing chamber, in contrast, is configured to move a prepared weight or set of weight to and from the weighing pan provided inside the weighing chamber. A weight preparation table provided inside the weighing chamber, as used in the context of the present disclosure, is not able and not configured to change the combination of weights in a set of weights, while robotic device 320 is suited, in many embodiments, to prepare sets of weights consisting of different weights with varying combinations of weights, wherein the different weights may be stored and/or put together in/on the storage and/or preparation area 310. The system may or may not comprise enclosure 330 for enclosing the weighing device, the robotic device, and the storage and/or preparation area.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

REFERENCE SIGNS LIST

1 Weighing device
11 Weighing chamber
12 housing
13 Feet of weighing device
14 Weighing pan
15 Suspension structure for weight preparation table 14
16 Weight preparation table
17 Weight preparation table
18 Center of the weighing pan
20 Actuation and guide mechanism
30 Object, weight
50 Method step
52 Method step
54 Method step
56 Method step
58 Method step
60 Method step
62 Method step
64 Method step
111 Weighing chamber door
140 Edge of weighing pan
141 Bars of weighing pan
142 Base plate of weighing pan
160 Edge of weight preparation table
161 Bars of weight preparation table
162 Base of weight preparation table
201 Horizontal linear guides
202 Vertical linear guides
300 Weighing system
310 Storage and/or preparation area
320 Robotic device
330 Enclosure of weighing system
a Width of bar of weight preparation table
b Width of void between neighbouring bars of weight preparation table
h Height of bars of weight preparation table
x Horizontal direction
y Horizontal direction
z Vertical direction
A Width of bar of weighing pan
B Width of void between neighbouring bars of weighing pan
D Distance from edge of weight preparation table to edge of weighing pan
H Clear height of void between neighbouring bars of weighing pan

What is claimed is:

1. A weighing device comprising:
at least one weight preparation table; and
a weighing pan functionally connected to a load cell;
wherein the at least one weight preparation table and the weighing pan are displaceable relative to each other along at least two linear axes;
wherein a first one of the at least two linear axes is a horizontal axis and a second one of the at least two linear axes is a vertical axis;
wherein displaceability is restricted to purely linear translational displacement along the at least two linear axes;
wherein the displacement along the first one of the at least two linear axes is a horizontal displacement and the displacement along the second one of the at least two linear axes is a vertical displacement;

wherein the horizontal displacement is such that the at least one weight preparation table is positionable in at least two different positions relative to the weighing pan;

wherein in a first one of the at least two different positions the at least one weight preparation table is laterally offset from a center of the weighing pan in a vertical view;

wherein in a second one of the at least two different positions the at least one weight preparation table is overlapping the center of the weighing pan in the vertical view;

wherein the weighing pan and the at least one preparation table are enclosed within a weighing chamber of the weighing device;

wherein the weighing device is configured to restrict any motion of the at least one weight preparation table and of the weighing pan that contributes to the relative displacement between the at least one weight preparation table and the weighing pan to within the weighing chamber.

2. The weighing device according to claim 1, comprising:

at least two weight preparation tables, wherein each of the weight preparation tables is displaceable along a horizontal axis, wherein the at least two weight preparation tables are displaceable along their horizontal axis independently from each other and wherein these displaceabilities are purely linearly translational displacements, wherein a first one of the at least two weight preparation tables is horizontally displaceable on a first lateral side of the weighing pan and a second one of the at least two weight preparation tables is horizontally displaceable on a second lateral side of the weighing pan.

3. The weighing device of claim 1, wherein:

the weighing chamber comprises at least one inner door which is arranged and configured to selectively subdivide the weighing chamber into an inner compartment and at least one outer compartment;

the inner compartment includes the weighing pan and the at least one outer compartment is located between the at least one inner door when in a closed state and an end of the weighing chamber; and at least one of the at least one outer compartment is located between one of the at least one inner door and an outer door of the weighing chamber.

4. The weighing device according to claim 1, wherein:

the weighing pan is a hanging weighing pan which is suspended at a suspension location which is positioned above a top face of the weighing pan;

the weighing pan is suspended at a position at or proximate the ceiling of the weighing chamber.

5. The weighing device of claim 1, wherein:

the elements of the weighing device enclosed by the weighing chamber are, besides stationary parts of the weighing device, restricted to the at least one weight preparation table, the weighing pan, a suspension structure for the weighing pan, and an actuation and guide mechanism for the at least one weight preparation table;

the at least one weight preparation table and the actuation and guide mechanism of the at least one weight preparation are adapted and configured to enable displacement of the at least one weight preparation table along a horizontal axis at least; and the elements of the weighing device enclosed by the weighing chamber comprise, if present, a locking mechanism adapted and configured to selectively fixing the position of the weighing pan with respect to a housing of the weighing device.

6. The weighing device of claim 1, comprising:

a locking mechanism adapted and configured to selectively fixing the position of the weighing pan with respect to a housing of the weighing device.

7. The weighing device of claim 1, wherein:

the weighing pan and the at least one weight preparation table each comprise a multitude of parallel bars with voids between each pair neighbouring bars, wherein the upper edges of the bars of the weighing pan form a top face of the weighing pan and the upper edges of the bars of the at least one weight preparation table form a top face of the at least one weight preparation table;

the voids between neighbouring bars are open at the respective top side, wherein the bars of the weighing pan and the bars of the at least one weight preparation table extend parallel to each other;

the dimension and arrangement of the bars of the weighing pan and the bars of the at least one weight preparation table are configured such that the weighing pan and the at least one weight preparation table are superimposable by receiving bars of any one of the at least one weight preparation table in the voids between neighbouring bars of the weighing pan and receiving bars of the weighing pan in the voids between neighbouring bars of the respective one of the at least one weight preparation table;

the weighing pan and the at least one weight preparation table are configured, while the weighing pan and any one of the at least one weight preparation table are superimposed, for the respective weight preparation table to be positionable with its top face lower than the top face of the weighing pan.

8. The weighing device of claim 7, wherein:

the at least one weight preparation table and the weighing pan are displaceable relative to each other along a vertical linear displacement axis and are displaceable relative to each other along exactly one horizontal linear displacement axis;

the bars of the weighing pan and the bars of the weight preparation table extend parallel to the exactly one horizontal linear displacement axis;

in a view along the exactly one horizontal linear displacement axis, each bar of the at least one weight preparation table is arranged either in registry with a void between two neighbouring bars of the weighing pan or lateral of the weighing pan;

each bar of the at least one weight preparation table is dimensioned to fit within the void between two neighbouring bars of the weighing pan with which it is in registry.

9. A system comprising:

the weighing device of claim 1;

a robotic device; and at least one of a storage area and a preparation area (310);

wherein the robotic device, the storage area, if present, and the preparation area, if present, are provided outside the weighing chamber of the weighing device;

wherein the robotic device is adapted and configured to move objects from the storage area or the preparation area into the weighing chamber and onto one of the at least one weight preparation table and to remove an object from said weight preparation table and the weighing chamber and place it in the storage area or on the preparation area.

10. A method for weight determination, the method comprising:

providing a weighing pan inside a weighing chamber, wherein the weighing pan is functionally connected to a load cell, and providing a weight preparation table inside the weighing chamber, wherein the weight preparation table is in a first position relative to the weighing pan, wherein in the first position the weight preparation table is laterally offset from a center of the weighing pan in a vertical view;

providing at least one object to be weighed on the weight preparation table, wherein a top face of the weight preparation table is provided at a vertical position higher than a top face of the weighing pan;

horizontally displacing the weight preparation table and the weighing pan relative to each other until the weight preparation table takes a second position relative to the weighing pan, wherein in the second position the weight preparation table overlaps the center of the weighing pan in the vertical view;

vertically displacing the weight preparation table and the weighing pan relative to each other until the top face of the weight preparation table is at a vertical position lower than that of the weighing pan, thereby placing the at least one object to be weighed on the weighing pan, wherein all displacements of the weight preparation table and of the weighing pan that contribute to the relative displacement between the weight preparation table and the weighing pan are purely linear displacements within the weighing chamber; and taking a reading from the load cell.

11. The method of claim 10, further comprising:

vertically displacing the weight preparation table and the weighing pan relative to each other with the weight preparation table being in the second position and located below the at least one object to be weighed and the top face of the weight preparation table being initially located at a vertical position lower than the top face of the weighing pan, until the top face of the weight preparation table is at a vertical position above the top face of the weighing pan, thereby removing the at least one object to be weighed from the weighing pan and supporting the at least one object to be weighed on the weight preparation table; and horizontally displacing the weight preparation table with the at least one object to be weighed placed thereon and the weighing pan relative to each other until the weight preparation table is positioned in the first position, wherein all displacements of the weight preparation table and of the weighing pan that contribute to the relative displacement between the weight preparation table and the weighing pan are a purely linear displacements within the weighing chamber.

12. The method of claim 11, wherein:

providing a weight preparation table comprises providing a first weight preparation table and providing a second weight preparation table.

13. The method according to claim 12 wherein:

the first weight preparation table carries a first set of at least one object to be weighed and the second weight preparation table carries a second set of at least one object to be weighed; and the method steps are performed with the first weight preparation table, thereby determining the weight of the first set of at least one object to be weighed, and the method steps are subsequently performed with the second weight preparation table, thereby determining the weight of the second set of at least one object to be weighed.

14. The method of claim 10, further comprising:

conveying at least one object to be weighed from outside the weighing chamber to within the weighing chamber; and placing the at least one object onto a weight preparation table arranged inside the weighing chamber so as to provide the at least one object to be weighed on the weight preparation table.

* * * * *